April 16, 1957  I. J. SPAETH ET AL  2,788,869
RAILWAY BRAKE GEAR SAFETY STRUCTURE
Filed Jan. 21, 1955
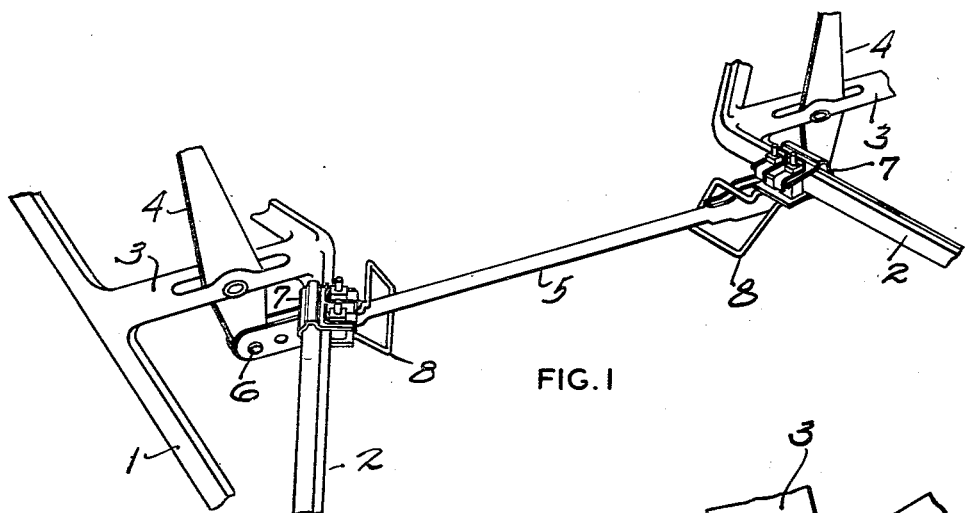
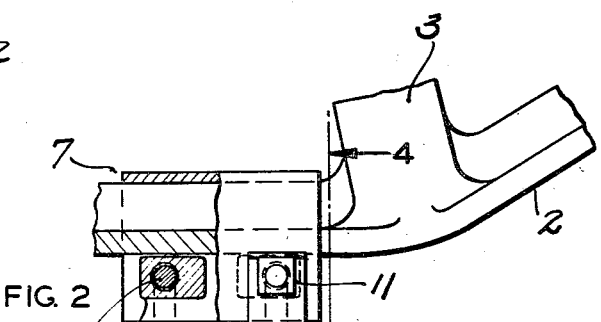
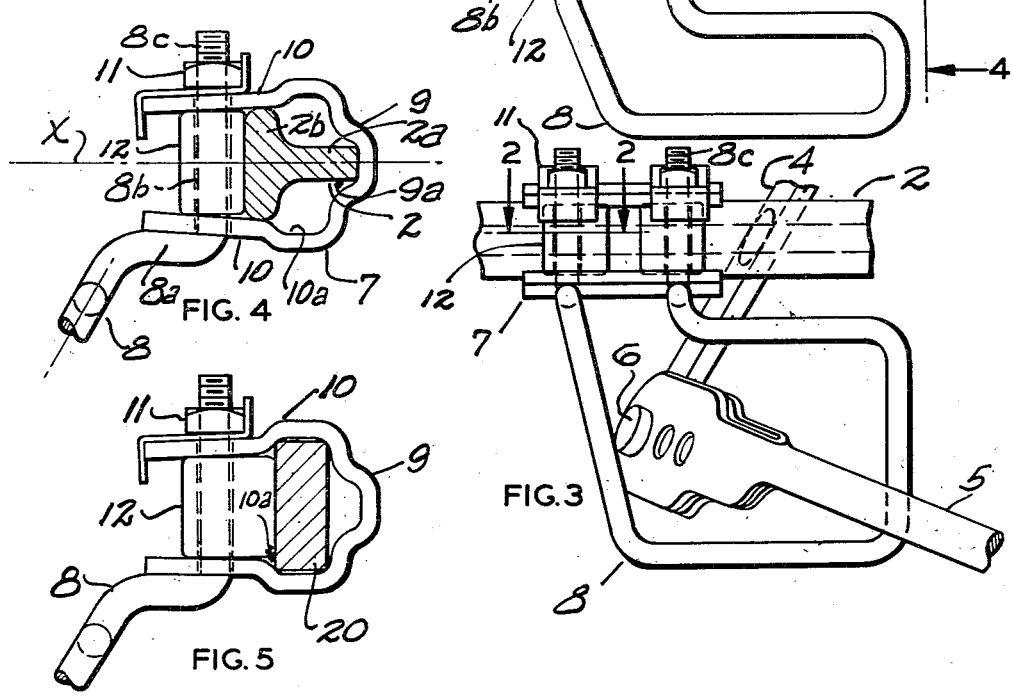

United States Patent Office 2,788,869
Patented Apr. 16, 1957

2,788,869

RAILWAY BRAKE GEAR SAFETY STRUCTURE

Irvin J. Spaeth, Chicago, Ill., and Rodney Bedell, Webster Groves, Mo., assignors to Chicago Railway Equipment Company, Chicago, Ill., a corporation of Illinois Application January 21, 1955, Serial No. 483,373

9 Claims. (Cl. 188—210)

The invention relates to railway brake gear and consists in a novel arrangement of brake beam, bottom connecting rod, and safety guard, whereby the rod is held against falling to the track in the event of removal or failure of its connection to a brake lever.

Safety guards having the same general objective have been mounted upon truck spring planks and bolsters and upon the strut of a truss type brake beam. Many trucks do not have spring planks. A spring-mounted truck bolster has substantial movement relative to the truck brake gear, thus requiring an otherwise unnecessary extension of the safety guard. Neither a spring plank nor a bolster safety guard will underlie the connection rod as near to its end as its normal support from the brake lever. If the brake arrangement is of the clasp type, the bottom connecting rod does not even extend under the spring plank or bolster. The mounting of a safety guard on the beam strut requires a special strut structure.

The main object of the present invention is to provide a safety guard for a brake beam bottom connecting rod, and particularly for such a rod used on a clasp brake arrangement, which is readily applicable to a beam main member such as the tension member of a truss brake beam at any desired point lengthwise of the member and without requiring any special formation of the beam member to which it is applied.

Another object of the invention is to adapt the safety guard for application to beam main members having cross sections of substantially different depth and contour.

These and other incidental objects as will appear from the following description are attained by the structure illustrated in the accompanying drawings, in which:

Figure 1 is a perspective of a pair of associated brake beams and levers with a bottom connecting rod between the lower ends of the levers, the beams being provided with safety guards underlying the bottom connecting rod.

Figure 2 is a top view of a portion of the beam shown at the left hand side of Figure 1, with a safety guard mounted thereon. A portion of the structure is sectioned on the line 2—2 of Figure 3.

Figure 3 is a front view of the structure shown in Figure 2. The brake lever and connecting rod are also indicated in this figure.

Figure 4 is a detail section taken on the line 4—4 of Figure 2.

Figure 5 is a detail section similar to Figure 4, but illustrating the structure applied to a beam member having a different depth and contour from that shown in Figures 1–4.

Each of the beams shown in Figure 1 is of the one-piece cast truss type comprising a compression member 1, a tension member 2, and a strut 3 slotted to receive a brake lever 4 which normally is inclined at an angle of approximately 40° to the vertical and extends downwardly below the beam. A bottom connecting rod 5 extends between and is pinned to the lower ends of the levers and normally is supported by pins 6.

Mounted on each beam tension member 2 is a guard comprising a bracket 7 and a stirrup 8 depending from the bracket. The bracket is U-shaped in its general contour with its cross bar 9 disposed substantially vertically and its legs 10 disposed substantially horizontally. The beam tension member 2 is of T cross section and is received within the bracket with the outer edge of its leg 2a seated in a recess 9a in the inner face of the beam cross bar 9 and with the edges of its cross arm 2b seated against the inner faces of legs 10.

Stirrup 8 is disposed to open upwardly. Its intermediate portion forms a rectangular loop lying in a plane inclined to the general plane of the beam, as determined by its compression and tension members, as best indicated at X in Figure 4.

The major portion of the loop is offset lengthwise of the beam from bracket 7, as best indicated in Figure 3. The terminals of the loop extend horizontally at 8a, to form upwardly facing shoulders seating the bracket lower leg 10, and then upwardly, as indicated at 8b, and have threaded ends 8c for nuts 11, whereby the bracket may be firmly clamped to beam tension member 2. A spacer 12 surrounds each loop terminal and limits the approach of the bracket legs 10 towards each other without interfering with their clamping function. The opening in each spacer for the stirrup terminal 8b is disposed eccentrically of the spacer and when the spacer is positioned as indicated in Figures 1–4, one of the spacer sides which is nearest to the opening opposes the bracket cross bar 9 and forms a seat for a corresponding face of the beam tension member.

The bracket legs 10 have recesses 10a on their inner faces adjacent to the bracket cross bar 9, thus adapting the bracket for application to a bar-type tension member 20 of a built-up beam shown in Figure 5, in which the upper and lower edges of the tension member are received in recesses 10a. If the bracket is applied to a tension member of this type, spacer 12 may be shifted about the axis of the stirrup terminal 8b so that the face of the spacer more remote from its opening opposes the bracket cross bar 9 and forms a seat for the corresponding face of the tension member.

The structure described is readily applicable to and removable from a brake beam without requiring any special formation of the latter or any machining or other modification of the beam and may be placed at any desired point along the beam spaced from the strut and quickly and securely clamped in position. The stirrups extend downwardly from the beam and towards the other beam so as to underlie the bottom connecting rod at points on the latter spaced from the adjacent jaws, thereby reducing the length of the stirrup and also providing supports at points spaced from the ends of the jaws so that there is little likelihood of the jaws being pulled out of the supports.

The details of the structure may be varied substantially without departing from the spirit of the invention and the exclusive use of those modifications coming within the scope of the claims is contemplated.

What is claimed is:

1. A railway brake beam bottom rod guard comprising a U-shaped bracket consisting of a cross piece and spaced legs and adapted to seat a beam main member against its cross piece and between its legs, and an elongated stirrup depending therefrom and forming an upwardly facing rod-receiving loop with terminals extending through the bracket legs and provided with means for drawing the bracket legs towards each other.

2. A railway brake beam bottom rod guard comprising a U-shaped bracket consisting of a cross piece and spaced legs and adapted to seat a beam main member against its cross piece and between its legs, and an elongated stirrup depending therefrom and forming an upwardly facing rod-receiving loop with terminals extending through the bracket legs and provided with means for drawing the bracket legs towards each other, the inner face of the bracket cross piece having a recess intermediate the bracket legs and the adjacent inner faces of each of the bracket legs having a recess adjacent to the bracket cross piece, said recesses and the remaining portions of said faces forming selective seats adapted to receive and engage beam main members of different shapes and depths of cross section.

3. A railway brake beam bottom rod guard comprising a U-shaped bracket consisting of a cross piece and spaced legs and adapted to seat a beam main member against its cross piece and between its legs, and an elongated stirrup depending therefrom and forming an upwardly facing rod-receiving loop with terminals extending through the bracket legs and provided with means for drawing the bracket legs towards each other, the bracket legs being spaced apart and adapted to engage the edges of the cross arm of a beam main member with a T cross section and the inner face of the bracket cross piece being recessed intermediate the bracket legs to form a seat adapted to receive and engage the edge of the leg of a T-shaped cross arm.

4. A railway brake beam bottom rod guard comprising a U-shaped bracket consisting of a cross piece and spaced legs and adapted to seat a beam main member against its cross piece and between its legs, and an elongated stirrup depending therefrom and forming an upwardly facing rod-receiving loop with terminals extending through the bracket legs and provided with means for drawing the bracket legs towards each other, the bracket legs being recessed to form seats adapted to receive and engage the opposite edges of a beam main member having a rectangular cross section.

5. A railway brake beam bottom rod guard comprising a U-shaped bracket consisting of a cross piece and spaced legs and adapted to receive a beam main member and seat it against its cross piece and its legs, and an elongated stirrup depending therefrom and forming an upwardly facing loop with terminals shouldered and extending through the bracket legs and threaded and provided with nuts for drawing the ends of the bracket legs towards each other to clamp the bracket about a beam member, the lower portion of the stirrup being offset lengthwise and transversely of the bracket.

6. A railway brake beam bottom rod guard comprising a U-shaped bracket consisting of a cross piece and spaced legs and adapted to seat a beam main member against its cross piece and between its legs, and an elongated stirrup depending therefrom and forming an upwardly facing rod-receiving loop with terminals shouldered and extending through the bracket legs and threaded and provided with nuts for drawing the ends of the bracket legs towards each other, there being a spacer surrounding at least one of the loop terminals and movable to different angular positions thereon and having an eccentric periphery facing towards the bracket cross piece.

7. In a railway truck brake gear, spaced truss type brake beams, each having a compression member and a tension member and a strut between them, a lever fulcrumed on each strut and extending downwardly therefrom and inclined from the vertical, a bottom connection rod having jaws at its ends primed to the lower ends of said levers and spaced lengthwise of the beam a substantial distance from the vertical plane of the struts, a safety guard for the connection rod detachably mounted on one of said members of each beam at a point spaced from the corresponding strut and comprising a U-shaped bracket, clamped to the beam member, and a stirrup depending therefrom and extending transversely of the beam towards the other beam and underlying the connection rod at a point spaced inwardly of the rod from the adjacent jaw.

8. In combination, a railway brake beam including a compression member and a tension member and a strut between them, and a bottom rod guard comprising a bracket, clamped to the tension member at a point spaced from the strut, and a stirrup member rigid with the bracket and extending therefrom downwardly, transversely, and longitudinally of the beam with its lower portion offset from beneath the tension member and spaced from its upper portion transversely of the length of the beam.

9. In combination, a railway brake beam including a compression member and a tension member and a strut between them, and a bottom rod guard comprising a bracket, clamped to the tension member at a point spaced from the strut, and a stirrup member rigid with the bracket and extending therefrom downwardly, transversely, and longitudinally of the beam with its lower portion offset from beneath the tension member and spaced from its upper portion transversely of the length of the beam, the bracket being U-shaped with an upright cross piece and vertically spaced horizontal legs adapted to receive beam main members of different depths between them and there is provided a bolt-like element for drawing the legs toward each other, there being a spacer between the legs and surrounding the bolt-like member and having an eccentric surfacing facing toward the cross piece and movable to different angular position about the bolt-like element to form an adjustable seat for a selected beam main member.

References Cited in the file of this patent

UNITED STATES PATENTS

| | | |
|---|---|---|
| 1,867,000 | Crone | July 12, 1932 |
| 2,196,249 | Busse | Apr. 9, 1940 |